United States Patent [19]

Tanaka

[11] Patent Number: 4,538,085
[45] Date of Patent: Aug. 27, 1985

[54] MAGNETO-TYPE D-C ELECTRIC MOTOR

[75] Inventor: Toshinori Tanaka, Himeji, Japan

[73] Assignee: Mitsubishi Denki Kabushiki Kaisha, Tokyo, Japan

[21] Appl. No.: 482,554

[22] Filed: Apr. 6, 1983

[30] Foreign Application Priority Data

Apr. 8, 1982 [JP] Japan .............................. 57-52118[U]
Nov. 2, 1982 [JP] Japan ........................... 57-167204[U]

[51] Int. Cl.³ ........................................... H02K 13/00
[52] U.S. Cl. ..................................... 310/239; 310/89; 310/154
[58] Field of Search ................. 310/239, 46, 241, 242, 310/244, 245, 246, 247, 154, 89, 91, 240

[56] References Cited

U.S. PATENT DOCUMENTS

| | | | |
|---|---|---|---|
| 1,808,747 | 6/1931 | Apple | 310/239 |
| 1,966,057 | 7/1934 | Winkel | 310/246 |
| 2,070,718 | 2/1937 | Ehrlich | 310/239 |
| 3,277,325 | 10/1966 | Staff | 310/247 |
| 3,445,693 | 5/1969 | Crawshaw et al. | 310/246 |
| 3,663,851 | 5/1972 | Persson | 310/154 |
| 4,414,481 | 11/1983 | de Jong | 310/154 |

FOREIGN PATENT DOCUMENTS

| | | | |
|---|---|---|---|
| 0741538 | 11/1943 | Fed. Rep. of Germany | 310/242 |
| 1613207 | 6/1970 | Fed. Rep. of Germany | 310/239 |
| 2733130 | 2/1979 | Fed. Rep. of Germany | 310/247 |
| 1124722 | 8/1968 | United Kingdom | 310/246 |
| 2075276 | 11/1981 | United Kingdom | 310/242 |
| 0598164 | 2/1978 | U.S.S.R. | 310/239 |
| 0743088 | 6/1980 | U.S.S.R. | 310/246 |

Primary Examiner—R. Skudy
Attorney, Agent, or Firm—Wenderoth, Lind & Ponack

[57] ABSTRACT

A magneto-type D-C electric motor including a cylindrical yoke, field poles consisting of permanent magnets that are adhered onto the inner peripheral surface of the yoke, a bracket coupled to the yoke, an armature which is rotatably supported by the bracket and which is opposed to the field poles in the radial direction, brushes which are brought into slidable contact with the armature to supply electric power thereto, a brush holder which is secured to bracket and which holds brushes, and an engaging member which engages with the brush holder and with the field poles to determine the positions of field poles and brush holder relative to each other in the circumferential direction.

3 Claims, 9 Drawing Figures

MAGNETO-TYPE D-C ELECTRIC MOTOR

BACKGROUND OF THE INVENTION

1. Field of the Invention

This invention relates to an improved magneto-type D-C electric motor.

2. Prior Art

A conventional motor of this type is shown in FIG. 1, in which reference numeral 1 denotes a magneto-type D-C electric motor, and reference numeral 2 denotes a field device which consists of a cylindrical yoke 3 made of a soft steel plate and a permanent magnet 4 adhered to the inner peripheral surface of the yoke with an adhesive agent. Reference numeral 5 denotes a rear bracket fastened to a socket portion 3a which is formed in an end surface of the yoke 3, reference numeral 6 denotes a brush device secured to the rear bracket, reference numeral 7 denotes a brush for supplying electric power, reference numeral 8 denotes a brush holder for slidably holding the brush, reference numeral 9 denotes an insulation plate which is secured together with the brush holder as a unitary structure, and reference numeral 10 denotes a base plate secured to the rear bracket 5. Reference numeral 11 denotes a sleeve bearing fitted to a protruded portion 5a of the rear bracket 5, reference numeral 12 denotes an armature which is supported by the rear bracket via the sleeve bearing 11 in a manner to be opposed to the permanent magnet 4 maintaining a small gap in the radial direction, reference numeral 13 denotes a rotary shaft of the armature, and reference numeral 14 denotes a commutator fitted to a rear portion of the rotary shaft 13. The brush 7 is brought into slidable contact with the commutator 14. Reference numeral 16 denotes an armature core on which are wound armature coils, reference numeral 17 denotes a thrust washer, and 18 denotes a stopper.

Operation of the thus constructed conventional motor will be described below.

When power-source device (not shown) is connected to the brushes 7, the armature 12 is served with electric power via commutator 14 and is energized. Namely, the armature 12 rotates since it is urged by the permanent magnet 4. A reactive rotational force is developed in the permanent magnet 4, and is transmitted to the yoke 3 via the layer of adhesive agent.

In the conventional device as mentioned above, the permanent magnet 4 constituting the field poles, and the brush holder 8 are separately positioned in the circumferential direction. Therefore, it is difficult to accurately place the brush holder and the field poles at predetermined positions relative to one another. Namely, error develops with regard to positions for mounting the brush holder and the field poles during the assembling steps, causing the electric characteristics of the motor to become deteriorated.

SUMMARY OF THE INVENTION

The purpose of this invention is to eliminate the above-mentioned defects inherent in the conventional devices, and makes it possible to maintain constant a positional relationship between the brush holder and the field poles relying upon the construction that will be described below.

BRIEF DESCRIPTION OF THE DRAWINGS

In the drawings, the same reference numerals denote the same or corresponding portions.

DETAILED DESCRIPTION OF THE PREFERRED EMBODIMENTS

Figure 1:
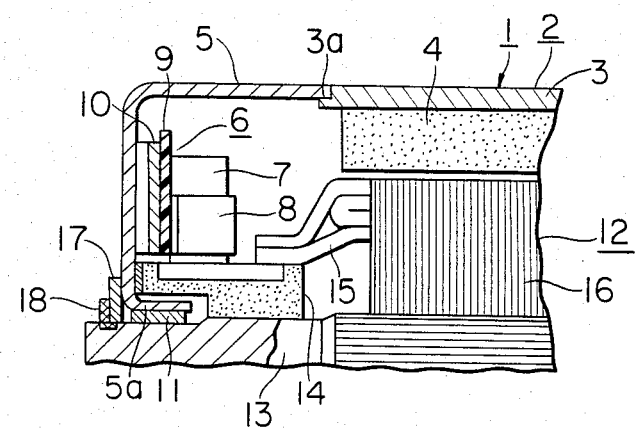
FIG. 1 is a front view showing, partly in cross section, a conventional magneto-type D-C electric motor.
Figure 2A:
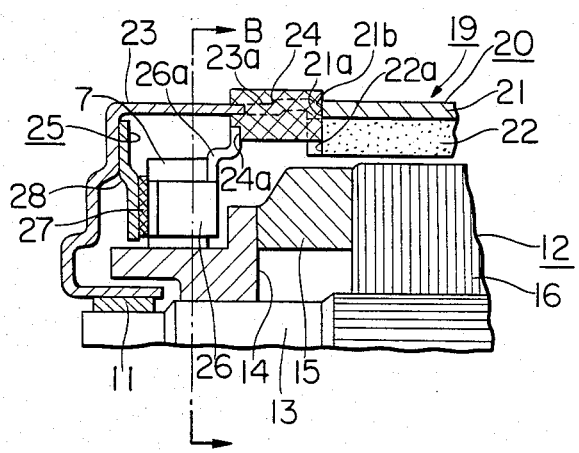
FIG. 2A is a front view showing, partly in cross section, a magneto-type D-C electric motor according to an embodiment of this invention.
Figure 2B:
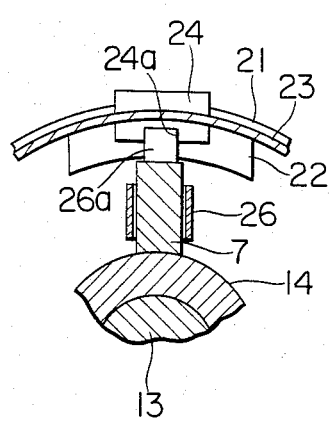
FIG. 2B is a section view along the line B—B of FIG. 2A.

FIGS. 2A and 2B illustrate an embodiment of this invention, in which reference numeral 19 denotes a magneto-type electric motor, reference numeral 20 denotes a field device, reference numeral 21 denotes a cylindrical yoke consisting of a soft steel plate, and reference numeral 22 denotes a field pole which is adhered onto the inner peripheral surface of the yoke and which consists of a permanent magnet of ferrite. Reference numeral 23 denotes a rear bracket which is fastened to a socket portion 21a of the yoke 21, and reference numeral 24 denotes a grommet which constitutes an engaging member and which engages a cut-away portion 23a of the rear bracket, with a cut-away portion formed at an end portion of the yoke 21, so as to provide a circumferential symmetrical connection between yoke 21 and bracket 23 and with a groove 22a formed in the end portion of the field pole 22. Reference numeral 25 denotes a brush device secured to the rear bracket 23, and reference numeral 26 denotes a brush holder for holding the brush 7. A protrusion 26a which serves as an engaging member protrudes in the axial direction, and engages with the cut-away portion 24a of the grommet 24 to place the brush holder 26 in position. Reference numeral 27 denotes an insulation plate which is secured with the brush holder 26 as a unitary structure, and reference numeral 28 denotes a base plate fastened to the rear bracket 23. Except for the above-mentioned members, the motor is constructed in the same manner as the conventional motor of FIG. 1 and, hence, the same portions are denoted by the same reference numerals and their description is omitted.

Figure 3:
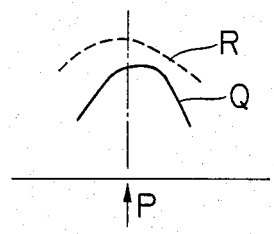
FIG. 3 is a graphical illustration of the characteristics of the motor of FIG. 2A.

In the thus constructed embodiment of the invention, the brush holder 26 is placed in position in the field device 20 via grommet 24, and the brush 7 and the field pole 22 are located at proper positions in the circumferential direction. As illustrated in FIG. 3, therefore, torque characteristics (curve Q) and output characteristics (curve R) are not deteriorated with a reference brush position (point P) as a center. In other words, the motor characteristics are not affected by error that may develop during the assembling steps.

In the above-mentioned embodiment, the brush holder 26 is indirectly attached to the field device 20 via grommet 24. The same effects, however, can also be obtained even when the brush holder is directly attached to the field pole. In this case, the motor can be constructed in a further reduced size and at a further reduced weight.

Another embodiment of the invention will be described below in conjunction with FIGS. 4A and 4B, in which reference numeral 29 denotes an electric motor, reference numeral 30 denotes a field device, reference numeral 31 denotes a cylindrical yoke, and reference numeral 32 denotes a brush device. An engaging member 34 which protrudes from the brush holder 33 engages a groove 35a formed in a field pole 35 in a tongue and groove manner. Reference numeral 36 denotes a rear bracket which is attached to the socket portion 31a of the yoke 31 by bolts that are not shown. Except for the above-mentioned portions, the electric motor is constructed in the same manner as the electric motor of FIGS. 2A and 2B and the same portions are denoted by the same reference numerals, and their description is omitted.

According to the present invention as described above, the brush 7 and the field pole 35 can be accurately positioned relative to each other in the circumferential direction, relying upon a very simple construction. Namely, the brush is accurately placed in position owing to the provision of an engaging member which engages the brush holder and the field pole to determine the positions of the field pole and the brush holder relative to each other.

Figure 4A:
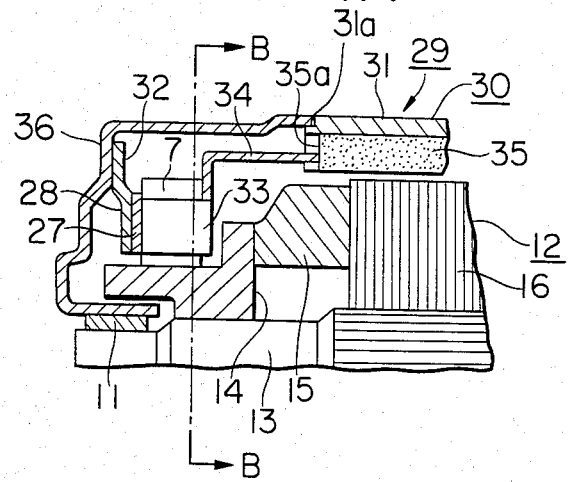
FIG. 4A is a front view showing, partly in cross section, a magneto-type D-C electric motor according to another embodiment of this invention.
Figure 4B:
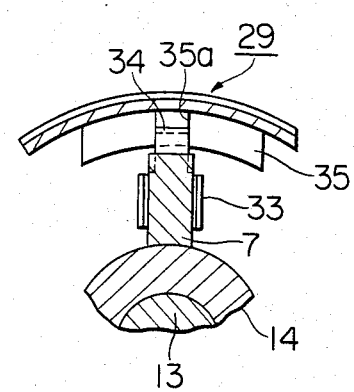
FIG. 4B is a section view along the line B—B of FIG. 4A.

In the above-mentioned embodiment of FIGS. 4A, 4B the brush holder and the field pole engage each other via an engaging member. In this case, however, the engaging member may further be engaged with the yoke or with the bracket to accomplish the positioning more reliably. In the above-mentioned embodiments, the brush device is provided in the rear bracket. The invention, however, can also be adapted to the case in which the brush device is provided in the front bracket.

Figure 5:
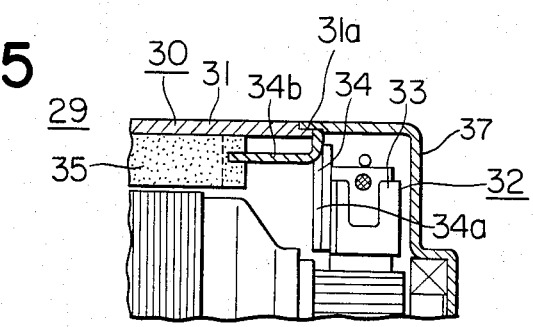
FIG. 5 is a front view showing, partly in cross section, a magneto-type D-C electric motor according to a further embodiment of this invention.
Figure 6A:
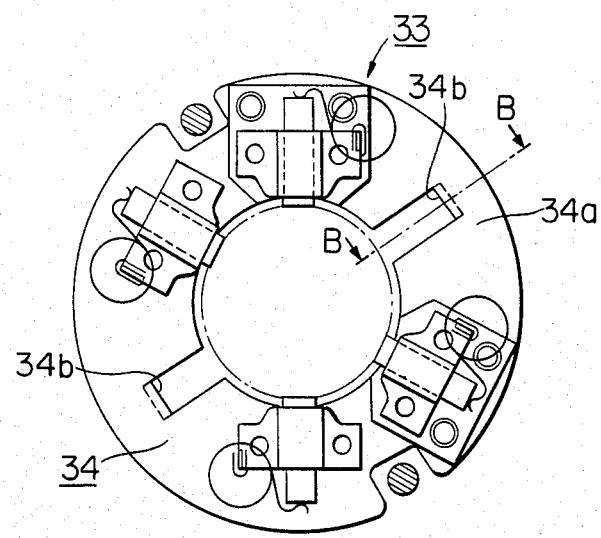
FIG. 6A is a plan view of a brush holder which is used for the embodiment of FIG. 5 (as viewed from the right in FIG. 5)
Figure 6B:
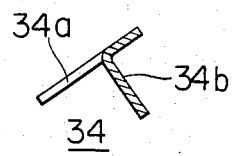
FIG. 6B is a section view along the line B—B of FIG. 6A.

FIG. 5 illustrates a further embodiment of this invention, and FIGS. 6A and 6B illustrate an engaging member used for the embodiment of FIG. 5, in which reference numeral 29 denotes an electric motor, reference numeral 30 denotes a field device, reference numeral 31 denotes a yoke, reference numeral 32 denotes a brush device, reference numeral 33 denotes a brush holder, reference numeral 34 denotes an engaging member, reference numeral 35 denotes a field pole, and reference numeral 37 denotes a front bracket. The front bracket is attached to the socket portion 31a formed in the yoke. The engaging member 34 is constructed as shown in FIGS. 6A and 6B. Namely a disc portion 34a is mounted on the brush holder 33, a folded portion 34b is fitted to an engaging portion formed in the field pole 35, and the peripheral portion is fitted to an engaging portion formed in the socket portion 31a. Owing to this construction, the engaging member is brought into engagement with the field device, with the brush holder and with the yoke, to more reliably determine a positional relationship between the field device and the brush holder, particularly in the circumferential direction.

What is claimed is:

1. A magneto-type D-C electric motor comprising:
   a cylindrical yoke having first engaging portions;
   field poles including permanent magnets having second engaging portions, adhered to the inner peripheral surface of said yoke;
   an armature opposed to said field poles in the radial direction with respect to the axis of rotation of said armature;
   a bracket coupled to said yoke, surrounding and rotatably supporting said armature;
   brushes in slidable contact with said armature to supply electric power thereto;
   a brush holder secured to said bracket and holding said brushes; and
   an engaging member having a disk portion secured to said brush holder, integral projecting portions fitted to said second engaging portions, and a circumferential portion engaging said first engaging portions and said bracket.

2. A motor as in claim 1, wherein said engaging member is a disk-shaped member having said integral projecting portion cut and bent out of the plane of said disk-shaped member.

3. A motor as in claim 1, wherein said bracket comprises a front end bracket.

* * * * *